United States Patent

Schaub

[11] Patent Number: 6,040,943
[45] Date of Patent: Mar. 21, 2000

[54] DIGITAL CAMERA OBJECTIVE WITH DIFFRACTIVE OPTICAL SURFACE

[75] Inventor: Michael P. Schaub, Tucson, Ariz.

[73] Assignee: Donnelly Optics, Tucson, Ariz.

[21] Appl. No.: 09/046,168

[22] Filed: Mar. 23, 1998

[51] Int. Cl.[7] .............................. G02B 27/44; G02B 3/02; G02B 9/00
[52] U.S. Cl. .......................... 359/565; 359/571; 359/716; 359/740; 359/784
[58] Field of Search ................................. 359/16, 19, 565, 359/571, 645, 661, 740, 784, 716

[56] References Cited

U.S. PATENT DOCUMENTS

| | | | |
|---|---|---|---|
| 4,623,224 | 11/1986 | Clarke | 359/645 |
| 5,218,471 | 6/1993 | Swanson et al. | 359/565 |
| 5,446,588 | 8/1995 | Missig et al. | 359/565 |
| 5,526,185 | 6/1996 | Herloski | 359/642 |
| 5,538,674 | 7/1996 | Nisper et al. | 264/1.31 |
| 5,581,405 | 12/1996 | Meyers et al. | 359/571 |
| 5,619,380 | 4/1997 | Ogasawara et al. | 359/661 |
| 5,631,779 | 5/1997 | Kashima | 359/570 |
| 5,715,090 | 2/1998 | Meyers | 359/565 |
| 5,768,030 | 6/1998 | Estelle et al. | 359/784 |
| 5,880,879 | 3/1999 | Foo | 359/565 |
| 5,966,244 | 10/1999 | Mukai et al. | 359/565 |

OTHER PUBLICATIONS

G. J. Swanson, "Binary Optics Technology: The Theory and Design of Multi–Level Diffractive Optical Elements", Technical Report 854, Massachusetts Inst. Techn., Lincoln Laboratory, Aug. 1989.

*Primary Examiner*—Cassandra Spyrou
*Assistant Examiner*—John Juba, Jr.
*Attorney, Agent, or Firm*—Benman & Collins

[57] ABSTRACT

A lens system having a reduced number of injection-molded singlet lens elements with at least one diffractive surface to control axial and lateral chromatic aberrations is disclosed. In one embodiment, the diffractive surface is placed on the first surface of the third lens, which is closest to the image plane. An opaque spacer provides suppression of stray light from reaching the image plane.

40 Claims, 2 Drawing Sheets

DIGITAL CAMERA OBJECTIVE WITH DIFFRACTIVE OPTICAL SURFACE

BACKGROUND OF THE INVENTION

1. Field of the Invention

The present invention relates generally to the field of lens systems, and, more particularly, to a digital camera objective having stray light suppression features.

2. Description of Related Art

Prior art complex lens systems with a relative aperture of F/2 and 50 degree field of view for color applications typically require numerous lens elements such as five or six lens elements in high index optical glass. These utilize doublet construction in at least two groups of lens elements to provide control of lateral and axial chromatic aberrations. The doublet construction typically consists of a positive lens of a low dispersion material and a negative lens of a high dispersion material. The disadvantage of the doublet construction is that it requires an extra element, which increases the cost of the lens system. Also, the overall length, weight, and cost of the lens system that utilizes numerous lens elements is increased.

There is a need to provide a lens system with a reduced number of elements, while still maintaining correction of chromatic aberrations.

SUMMARY OF THE INVENTION

In accordance with the present invention, a lens system for forming an image of an object is provided which comprises a reduced number of elements, while still maintaining correction of chromatic aberrations. This is achieved by using an appropriately defined and positioned diffractive surface. If the diffractive surface is positioned at (or near) the aperture stop, it will affect the axial aberration. The remaining lateral color may be corrected by using a high dispersion material for one of the lenses. However, if the diffractive surface is appropriately defined and positioned away from the aperture stop, it will affect both the axial and lateral color, and will eliminate the need for the high dispersion material. In any event, the number of lenses is reduced from the prior art five or six and the need for multiple materials.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

DESCRIPTION OF THE PREFERRED EMBODIMENTS

Reference is now made in detail to a specific embodiment of the present invention, which illustrates the best mode presently contemplated by the inventor for practicing the invention. Alternative embodiments are also briefly described as applicable.

In the preferred embodiment, the present invention is a digital camera objective having no more than five lens elements, preferably no more than four lens elements, and most preferably no more than three lens elements. Alternatively, the digital camera objective may have no more than two lens elements. In any event, each of the lens elements has a first surface and a second surface and at least one of the surfaces of the lens elements comprises a diffractive surface to correct axial and lateral chromatic aberrations. The digital camera objective may be used with any imaging system (e.g., cameras, camcorders, video conferencing imagers, scanners, etc.), employing detectors such as, but not limited or restricted to, charge coupled devices ("CCD"), charge injection devices ("CID"), or complementary metal oxide semiconductor ("CMOS") devices.

In the following description, details are given to provide an understanding of the present invention. It will be apparent to one skilled in the art that these specific details are not required in order to practice the present invention.

The lens system of the present invention forms an image of an object on an image plane. The object is located on the object side of the lens system, which comprises no more than five lens elements. Each of the lens elements has a first surface and a second surface, with at least one of the surfaces comprising a diffractive surface, which provides correction of axial and lateral chromatic aberrations of light passing through the lens system. In appropriate situations, the object and the image plane of the lens system may be interchanged.

Figure 1:
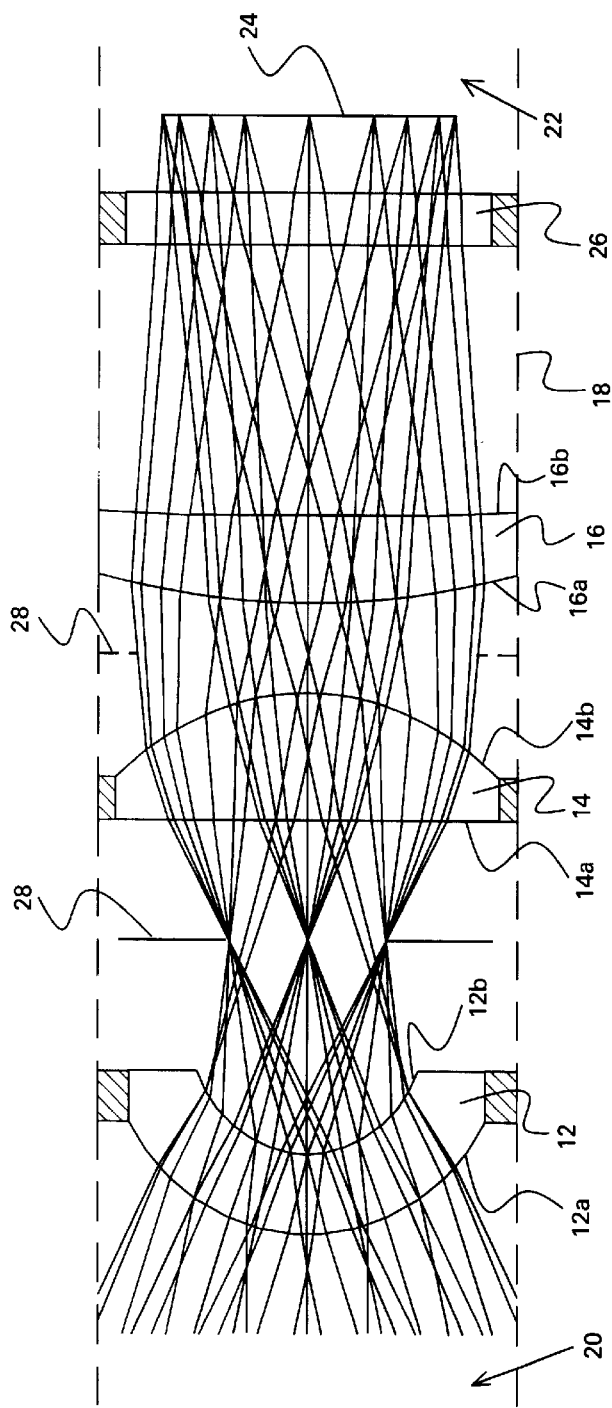
FIG. 1, in cross-section, illustrates a lens system of the present invention.

FIG. 1 is a cross-sectional view of a three element lens system 10 of the invention. The lens system 10 comprises a first lens 12, with a first surface 12a and a second surface 12b, a second lens 14 having a first surface 14a and a second surface 14b, and a third lens 16 having a first surface 16a and a second surface 16b. The lenses 12, 14, 16 are enclosed in a housing 18. The first lens 12 is closest to the object side, generally denoted at 20, while the third lens 16 is closest to the image side, generally denoted at 22. In a specific application, such as a camera, there may be a detector 24 located on the image side 22, with a window 26 between the third lens 16 and the detector 24.

Preferably, all of the lenses 12, 14, 16 may be injection-molded plastic singlet lenses, most preferably of a conventional crown-like material. Examples of suitable crown-like materials that may be employed in the practice of the present invention include acrylates and methacrylates.

To correct axial and lateral chromatic aberrations, one of the lens elements has a diffractive surface. It is preferred that this diffractive surface be on the first surface 16a of the third element 16, although it may be placed on another surface such as, but not restricted to, the second surface 14b of the second element 14.

The first element 12 is a negative lens, which serves to increase the field of view. The second element 14 is a power lens. The surfaces of the first lens 12, the second lens 14, and the third lens 16 may be provided with aspheric surfaces.

An aperture stop 28 is placed between the first lens 12 and the second lens 14. Alternatively, but less preferred, the aperture stop 28 may be placed between the second lens 14 and the third lens 16, as shown in phantom. In any event, the aperture stop is an opaque spacer and serves to limit a bundle of rays passing through the first element 12. To further reduce stray light, the aperture stop 28 may be placed at both locations.

Figure 2:
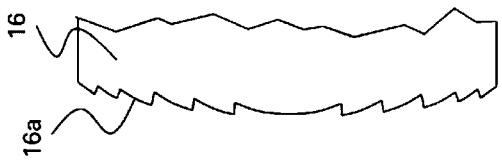
FIG. 2, also in cross-section, is a view of the diffractive surface employed in the practice of the present invention.

FIG. 2 shows a cross-sectional view of the diffractive surface, here, 16a. With this diffractive surface, the doublet construction of the prior art lens systems is no longer required. Since the diffractive surface 16a (or 14b) is away from the aperture stop 28 in the preferred case, it operates on both axial and lateral chromatic aberrations.

Turning now to the nature of the diffractive surface 16a (or 14b), it is well-known that a major difference between a refractive optical surface and a diffractive optical surface in ray tracing analysis is that a refractive surface is governed by Snell's law:

$$n_1 \sin\Theta_1 = n_2 \sin\Theta_2$$

where n is the refractive index of the material.

On the other hand, a diffractive optical surface is, in scalar terms, subject to the grating equation:

$$m\lambda = d \sin \Theta,$$

where m=diffractive order;

$\lambda$=the wavelength of the incident light beam;

d=grating periodicity; and $\Theta$=diffractive angle.

The grating height h is determined according to the formula $$h = \frac{\lambda}{(n-1)}.$$

Depending upon the particular effect desired, the feature size will be some multiple of h, where the multiple will determine the phase shift in units of wave-length. In practice, this multiple will generally be between 1/20 and 200 times the wavelength of light. Typical values include 1/4, 1/2, 3/4, 1, 2, 3, etc. In general, for plastic materials with visible light, this translates into feature heights on the order of micrometers.

The lateral dimensions of spacing of the features, as well as the periodicity, is determined differently for different diffractive patterns, as will be discussed in more detail below. Typically, the lateral dimensions will range from a fraction to about a thousand times the wavelength of light. For plastic materials with visible light, the range is generally between about one-half to about one hundred micrometers. It should be noted that the present invention applies equally as well to light outside the visible spectrum, i.e., infrared and ultraviolet light.

In refractive analysis, when a collimated beam of light impinges on a curved surface of a lens, the plane wavefront is transformed according to Snell's law into a spherical wavefront. Using a diffractive structure, the wavefront is transformed as determined by the grating equation.

The design of the diffraction grating itself depends upon its desired effect. For example, the diffractive surface may be designed to cooperate with the remaining refractive power to achieve the desired correction of chromatic aberration. Other uses include, but are not limited to, athermalization, replacement of refractive power, aspheric correction, or color filtration.

The design of the diffractive optical surface can be achieved through mathematical modeling, using any of several techniques depending upon the level of sophistication required. These techniques include scalar analysis, rigorous coupled wave theory, parabasal ray tracing, vector analysis, and the beam propagation method. Commercially available codes can be employed to carry out the diffractive design analysis. Some of these codes include "Code V" or "Light Tools", both from Optical Research Associates (Pasadena, Calif.), "ASAP" from Breault Research Organization (Tucson, Ariz.), "Diffract" from MM Research (Tucson, Ariz.), or "Grating Solver" from Grating Solver Development Corporation (Allen, Tex.). Examples of this mathematical analysis are discussed in more depth in U.S. Pat. No. 5,218,471 to Swanson et al., which is incorporated herein by reference. U.S. Pat. No. 5,538,674 to Nisper et al, which is incorporated herein by reference, discloses techniques for fabricating diffractive optical elements.

One example of such a lens system as depicted in FIG. 1 comprises:

a first lens 12 having a first surface 12a with a radius of 3 mm, and a second surface 12b having a radius of 1.6 mm, a second lens 14, having a first surface 14a with a radius of 166 mm, and a second surface 14b having a radius of −3.5 mm, and a third lens 16, having a first surface 16a with a diffractive optical element defined by the phase coefficient −6×10⁻3, and a second surface 16b having a radius of 800 mm.

Another example of such a lens system as depicted in FIG. 1 comprises:

a first lens 12 having a first surface 12a with a radius of 6.9 mm, and a second surface 12b having a radius of 1.9 mm, a second lens 14, having a first surface 14a with a radius of 12.4 mm, and second surface 14b having a radius of −6.7 mm, and a third lens 16, having a first surface 16a with radius 7.8 mm and with a diffractive optical element defined by the phase coefficient $-7.2 \times 10^{-3}$, and a second surface 16b having a radius of 8.3 mm.

Figure 3:
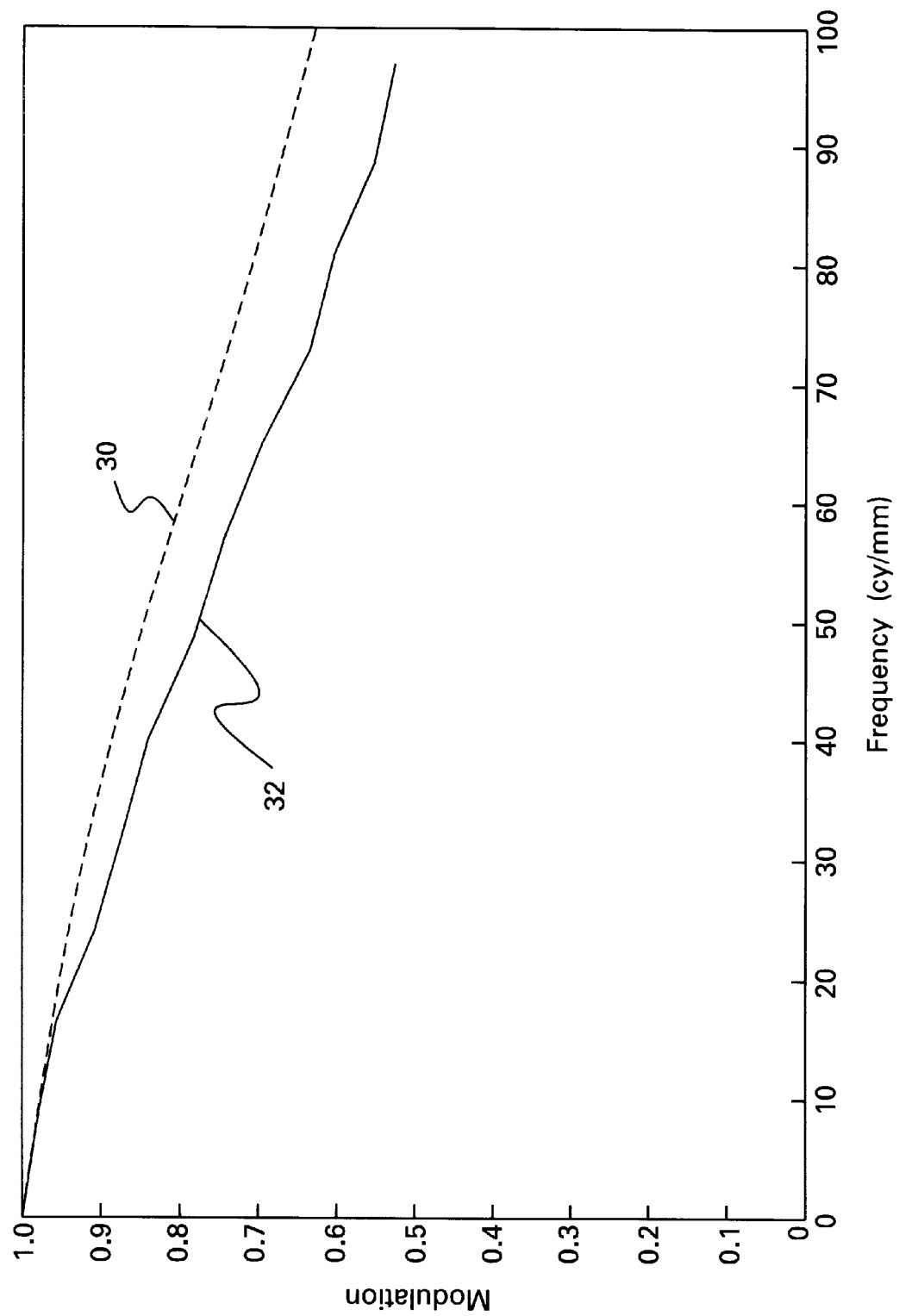
FIG. 3, on coordinates of relative modulation and frequency (in cycles per millimeter), is a plot depicting the modulation transfer function of a specific lens system of the present invention.

The modulation transfer function of one such lens system is depicted in FIG. 3, in which Curve 30 is the predicted result and Curve 32 is the measured result, indicating the high degree of correction of the system.

INDUSTRIAL APPLICABILITY

The digital camera objective of the present invention is expected to find use in still and video camera applications.

Thus, there has been disclosed a digital camera objective, which includes a lens having a diffractive surface. It will be readily apparent to those skilled in this art that various changes and modifications of an obvious nature may be made, and all such changes and modifications are considered to fall within the scope of the present invention, as defined by the appended claims.

What is claimed is:

1. A lens system for forming an image of an object on an image plane, said lens system comprising a first negative lens closest to an object side, a third lens closest to an image side, and a second power lens disposed between said first lens and said third lens, with each lens having first and second surfaces, at least one of said surfaces of said lenses comprising a diffractive surface, said lens system further comprising an opaque spacer between said second lens and said third lens, to prevent stray light from reaching said image side, said lens system comprising no more than three lens elements and being corrected for axial and lateral chromatic aberrations of light passing therethrough.

2. The lens system of claim 1 having an opaque spacer between said first lens and said second lens, creating an aperture stop to limit a bundle of rays passing through said first lens.

3. The lens system of claim 1 wherein at least one of said first surface and said second surface of said third lens comprises a diffractive surface.

4. The lens system of claim 3 wherein said first surface comprises said diffractive surface, said first surface being closer to said object side.

5. The lens system of claim 1 wherein at least one of said first surface and said second surface of the second lens comprises a diffractive surface.

6. The lens system of claim 5 wherein said second surface of said second lens comprises said diffractive surface, said second surface being closer to said image side.

7. The lens system of claim 1 wherein a detector is located on said image side at said image plane.

8. The lens system of claim 1 wherein each of said lens elements comprises a crown-like material.

9. The lens system of claim 1 in which at least one of said lens elements comprises a plastic material.

10. The lens system of claim 9 in which at least one of said lens elements comprises an injection-molded plastic material.

11. The lens system of claim 1 wherein at least one of said surfaces of said lens elements comprises a spheric surface.

12. The lens system of claim 1 wherein at least one of said surfaces of said lens elements comprises an aspheric surface.

13. A lens system for forming an image of an object on an image plane, comprising no more than three lens elements, each of said lens elements having a first surface and a second surface, said lens system comprising a first lens closest to an object side, a third lens closest to an image side, and a second lens disposed between said first lens and said third lens, wherein said third lens has a diffractive surface, wherein each of said lens elements comprises a crown-like material, and wherein at least one of said surfaces of said lens elements comprises an aspheric surface, said lens system being corrected for axial and lateral chromatic aberrations of light passing therethrough.

14. The lens system of claim 13 in which at least one of said lens elements comprises a plastic material.

15. The lens system of claim 14 in which at least one of said lens elements comprises an injection-molded plastic material.

16. The lens system of claim 13 wherein at least one of said surfaces of said lens elements comprises a spheric surface.

17. The lens system of claim 13 having an opaque spacer between said first lens and said second lens, creating an aperture stop to limit a bundle of rays passing through said first lens.

18. The lens system of claim 13 having an opaque spacer between said second lens and said third lens, to prevent stray light from reaching said image surface.

19. The lens system of claim 13 wherein said first surface of said third lens comprises said diffractive surface, said first surface being closer to said object side.

20. The lens system of claim 13 wherein a detector is located on said image side at said image plane.

21. A lens system for forming an image of an object on an image plane, said lens system comprising no more than three elements, each of said lens elements having a first surface and a second surface and comprising a crown-like material, said lens system being corrected for axial and lateral chromatic aberrations of light passing therethrough, said lens system comprising:

(a) a first negative lens closest to an object side, (b) a second power lens, (c) a third lens closest to said image plane, wherein said third lens has a diffractive surface on a surface away from said image plane; and (d) an opaque spacer between said first lens and said second lens, creating an aperture stop to limit a bundle of rays passing through said first lens.

22. The lens system of claim 21 wherein each of said first and second lenses has an aspheric surface.

23. The lens system of claim 21 wherein a detector is located at said image plane.

24. A lens system for forming an image of an object on an image plane, said lens system comprising a first negative lens closest to an object side, a third lens closest to an image side, and a second power lens disposed between said first lens and said third lens, with each lens having first and second surfaces, said first surface of said third lens comprising a diffractive surface, said first surface being closer to said object side, said lens system comprising no more than three lens elements and being corrected for axial and lateral chromatic aberrations of light passing therethrough.

25. The lens system of claim 24 having an opaque spacer between said first lens and said second lens, creating an aperture stop to limit a bundle of rays passing through said first lens.

26. The lens system of claim 24 having an opaque spacer between said second lens and said third lens, to prevent stray light from reaching said image side.

27. The lens system of claim 24 wherein a detector is located on said image side at said image plane.

28. The lens system of claim 24 wherein each of said three elements comprises a crown-like material.

29. The lens system of claim 24 wherein at least one of said lens elements comprises a plastic material.

30. The lens system of claim 29 wherein at least one of said lens elements comprises an injection-molded plastic material.

31. The lens system of claim 24 wherein at least one of said surfaces of said lens elements comprises a spheric surface.

32. The lens system of claim 24 wherein at least one of said surfaces of said lens elements comprises an aspheric surface.

33. A lens system for forming an image of an object on an image plane, said lens system comprising a first negative lens closest to an object side, a third lens closest to an image side, and a second power lens disposed between said first lens and said third lens, with each lens having first and second surfaces, said second surface of said second lens comprising a diffractive surface, said second surface being closer to said image side, said lens system comprising no more than three lens elements and being corrected for axial and lateral chromatic aberrations of light passing therethrough, wherein said lens elements each comprise a crown-like material.

34. The lens system of claim 33 having an opaque spacer between said first lens and said second lens, creating an aperture stop to limit a bundle of rays passing through said first lens.

35. The lens system of claim 33 having an opaque spacer between said second lens and said third lens, to prevent stray light from reaching said image side.

36. The lens system of claim 33 wherein a detector is located on said image side at said image plane.

37. The lens system of claim 33 wherein at least one of said lens elements comprises a plastic material.

38. The lens system of claim 37 wherein at least one of said lens elements comprises an injection-molded plastic material.

39. The lens system of claim 33 wherein at least one of said surfaces of said lens elements comprises a spheric surface.

40. The lens system of claim 33 wherein at least one of said surfaces of said lens elements comprises an aspheric surface.

* * * * *